Figure 1:
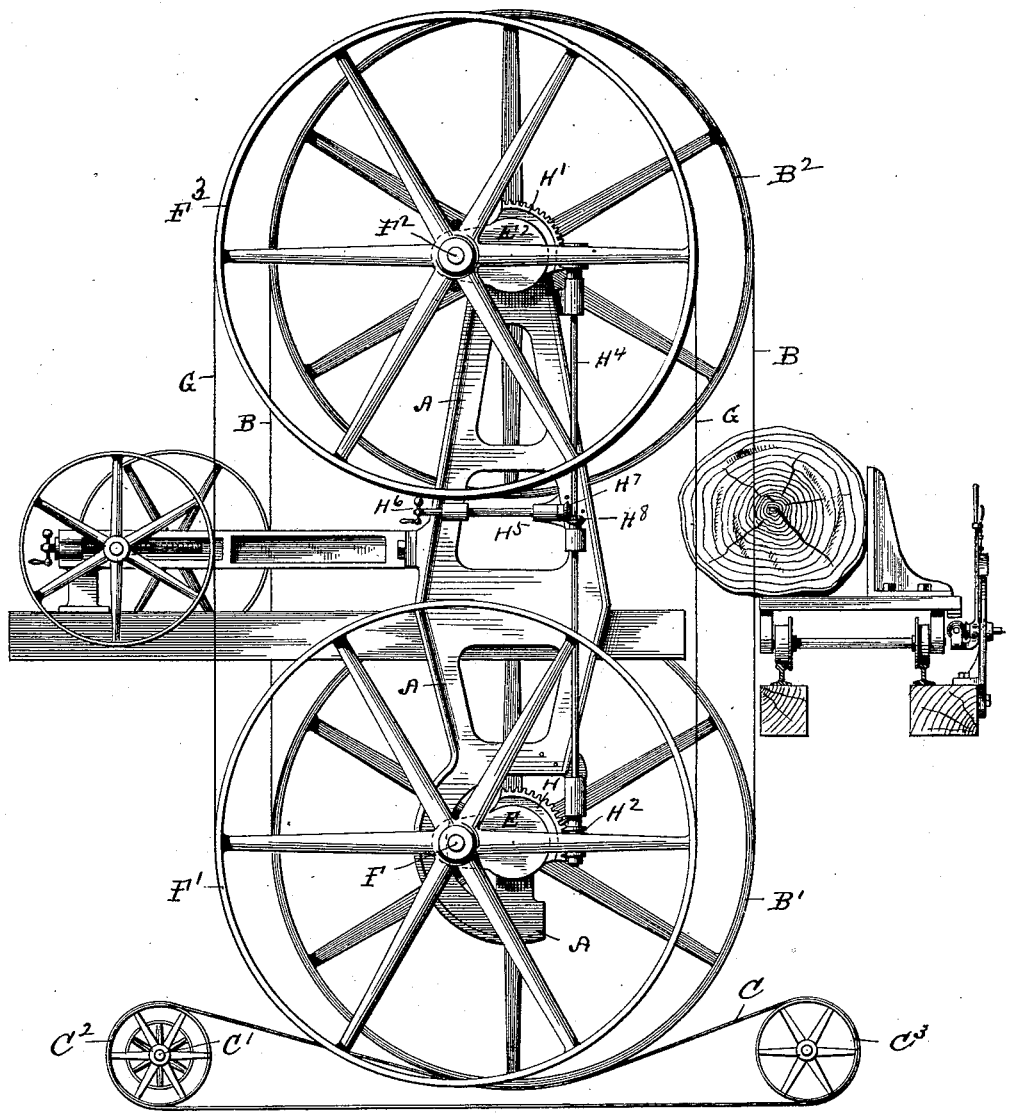

(No Model.)

2 Sheets—Sheet 1.

C. B. LONG.
BAND SAW MILL.

No. 475,328.

Patented May 24, 1892.

Witnesses
Chas. F. Schmelz.
H. M. Fowler

Inventor
Charles B. Long

By his Attorney
Rufus B. Fowler (No Model.) 2 Sheets—Sheet 2.
C. B. LONG.
BAND SAW MILL.
No. 475,328. Patented May 24, 1892.
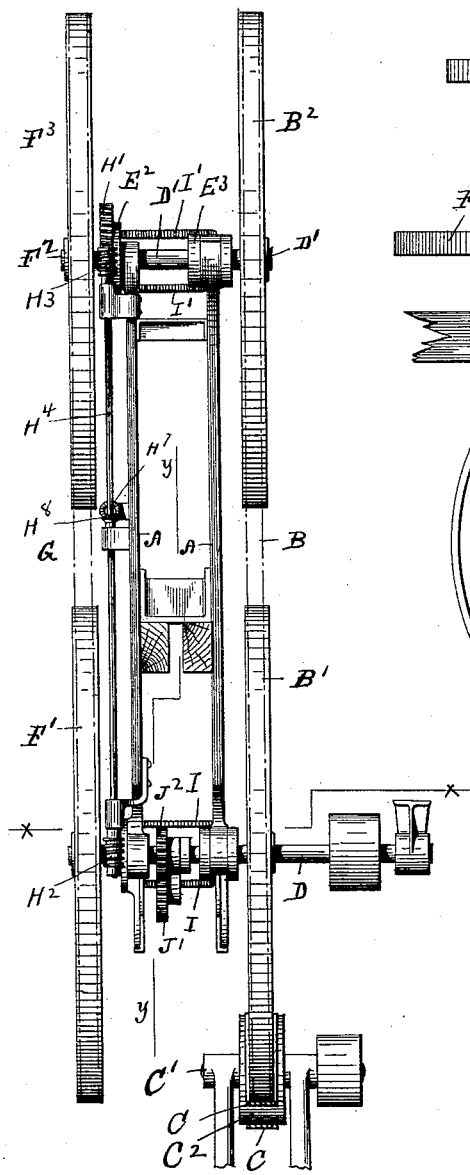
Fig. 2.
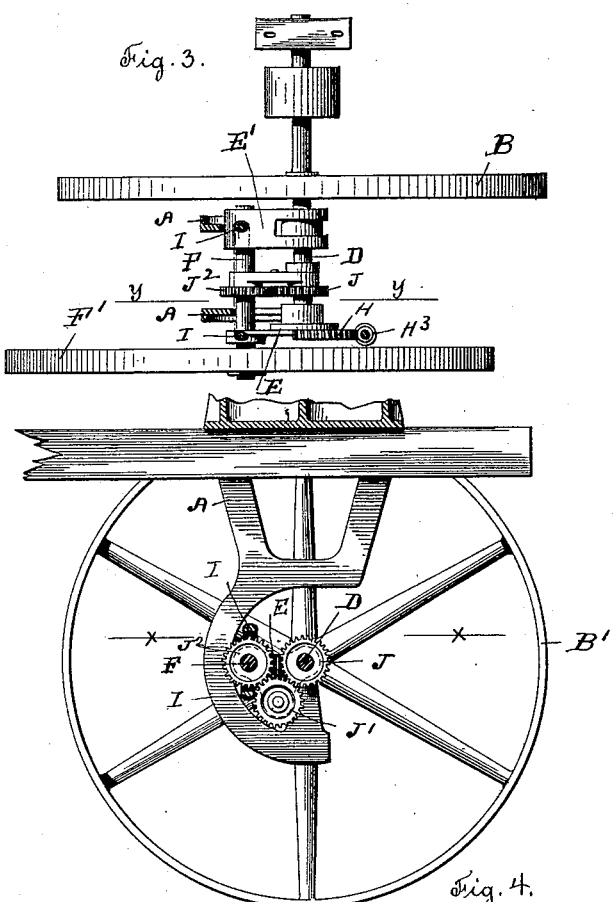
Fig. 3.
Fig. 4.
Witnesses
Chas. F. Schmelz.
H. M. Fowler.
Inventor
Charles B. Long
By his Attorney
Rufus B. Fowler.

UNITED STATES PATENT OFFICE.

CHARLES B. LONG, OF SHREWSBURY, MASSACHUSETTS.

BAND-SAW MILL.

SPECIFICATION forming part of Letters Patent No. 475,328, dated May 24, 1892.

Application filed March 26, 1890. Serial No. 345,444. (No model.)

*To all whom it may concern:*

Be it known that I, CHARLES B. LONG, a citizen of the United States, and a resident of Shrewsbury, in the county of Worcester and State of Massachusetts, have invented a new and useful Improvement in Band-Saw Mills, of which the following is a specification, reference being had to the accompanying drawings, representing a band-saw mill embodying my invention, and in which—

Figure 1 represents a view of one of my improved mills. Fig. 2 is a view presenting a face view of the wheels upon which the saws are carried. Fig. 3 is a sectional view on line X X, Fig. 2, representing the gearing by which one of the saws is driven by the rotation of the other. Fig. 4 is a view of the gearing shown in Fig. 3, it being a sectional view on line Y Y, Figs. 2 and 3.

Similar letters refer to similar parts in the different figures.

The object of my invention is to provide mechanism whereby two band-saws can be operated conjointly in a single mill; and it relates to the mechanism by which the saws are driven and by which the distance between the saws are varied, and also to certain details of construction, as hereinafter set forth.

Referring to the drawings, A denotes the frame-work by which the mechanism for carrying the saws is supported.

B denotes an endless saw carried upon the wheels $B'$ $B^2$ in the usual manner of band-saws. The wheels $B'$ $B^2$ are attached to shafts journaled in fixed bearings, and the lower wheel $B'$ is driven by a belt-pulley upon the shaft D or by frictional contact with the belt C, which is driven by power applied to the shaft $C'$, upon which is placed the belt-pulley $C^2$, which drives the belt, the pulley $C^3$ being a loose pulley over which the belt is carried. Turning upon the fixed shaft D, which carries the lower wheel $B'$, are arms E $E'$, in the free ends of which is journaled the shaft F, carrying a saw-wheel $F'$, and turning about the shaft $D'$, which carries the upper wheel $B^2$, are the arms $E^2$ $E^3$, in the free ends of which is journaled the shaft $F^2$, carrying the saw-wheel $F^3$, the pair of wheels $F'$ and $F^3$ carrying the band-saw G.

Attached to the crank-arms E and $E^2$ are the toothed sectors H $H'$, which are simultaneously turned by the worms $H^2$ $H^3$ upon the shaft $H^4$, which is operated by the horizontal shaft $H^5$, provided with the hand-crank $H^6$ through the beveled pinions $H^7 H^8$. The lower crank-arms E and $E'$, in which is journaled the lower movable shaft F, are connected by the frame-work I I, causing both arms to be moved around the fixed shaft D, simultaneously by the action of the toothed sector H and its actuating-worm $H^2$. Similarly the upper crank-arms $E^2$ and $E^3$ are united by the frame-work $I'$ $I'$ and for a like purpose. The rotation of the vertical shaft $H^4$ will therefore cause the shafts F and $F^2$ to be simultaneously moved around the axes of the fixed shafts D and $D'$. When the crank-arms are brought into a horizontal position, as represented in Fig. 1, the saws B and G are at a distance apart equal to the distance between the axes of the fixed shafts D $D'$ and the movable shafts F $F^2$; but as the crank-arms are rotated toward a vertical position above the fixed shafts the distance between the saws is continually decreased until the axes of the shafts F $F^2$ are brought into the same vertical plane as the axes of the shafts D $D'$ and the saws are brought into the same plane. Thus the space between the saws, or, more correctly, the distance between the plane of the saws, is varied. The lower wheel $F'$ is rotated by means of the driving-gear J on the shaft D, engaging an intermediate pinion $J'$ on a fixed stud, which engages the gear $J^2$ on the movable shaft F.

What I claim as my invention, and desire to secure by Letters Patent, is—

1. In a band-saw mill, the combination, with a pair of wheels carrying a band-saw and journaled in fixed bearings, of a second pair of wheels carrying a second band-saw, each of said second pair of wheels being journaled in separate frame-works, said frame-works being capable of a concentric movement about the axes of the first pair of saw-carrying wheels, whereby the distance between the saws is varied, substantially as described.

2. In a band-saw mill, the combination of a pair of wheels carrying a band-saw and having their shafts journaled in fixed bearings, a second pair of wheels carrying a second band-saw, each of said second pair of wheels having their shafts journaled in separate frame-works having a concentric movement around the axes of the first pair of wheels, whereby the distance between the saws is varied, and connecting operating mechanism between one of the shafts held in a fixed bearing and one of the shafts held in a movable frame-work, by which rotary motion is imparted to the variable saw from the saw-carrying mechanism by which the first or fixed saw is carried, substantially as described.

3. In a sawing-machine, the combination of a pair of wheels journaled in fixed bearings and carrying a saw, a pair of wheels journaled in bearings capable of being moved concentrically around the axes of the wheels journaled in the fixed bearings, toothed sectors attached to the frame-work of the movable bearings, and a shaft having worms engaging said toothed sectors, by which the position of the movable wheels is varied relatively to said fixed wheels, substantially as described.

4. In a sawing-machine, the combination of a pair of wheels journaled in fixed bearings and carrying a saw, a pair of wheels journaled in the free ends of arms capable of being moved concentrically around the axes of the fixed wheels, driving-gears upon the shafts of said fixed wheels, driven gears upon the shafts of said movable wheels, and intermediate gears engaging said driving and said driven gears and turning upon studs held in said movable arms, whereby said movable wheels are driven from the shafts of said fixed wheels, and saws carried upon said fixed and movable wheels, substantially as described.

5. In a band sawing-machine, the combination of the shafts D and D', journaled in fixed bearings, wheels B' and B², carried upon said shafts, a saw B, carried upon said wheels, arms E E², capable of an angular movement about the shafts D D' and having their free ends united by the frame-work I I', shafts F and F², journaled in said arms and carrying the wheels F' F³, saw G, carried upon said wheels F' F³, connecting mechanism by which the rotation of the shafts D D' is communicated to the shafts F F², and connected mechanism by which the arms E E' are moved about the shafts D D', substantially as described.

Dated the 14th day of March, 1890.

CHARLES B. LONG.

Witnesses:
RUFUS B. FOWLER,
H. M. FOWLER.